No. 709,976. Patented Sept. 30, 1902.
C. FERNSTROM.
LAWN TRIMMING IMPLEMENT.
(Application filed Sept. 12, 1901.)
(No Model.)
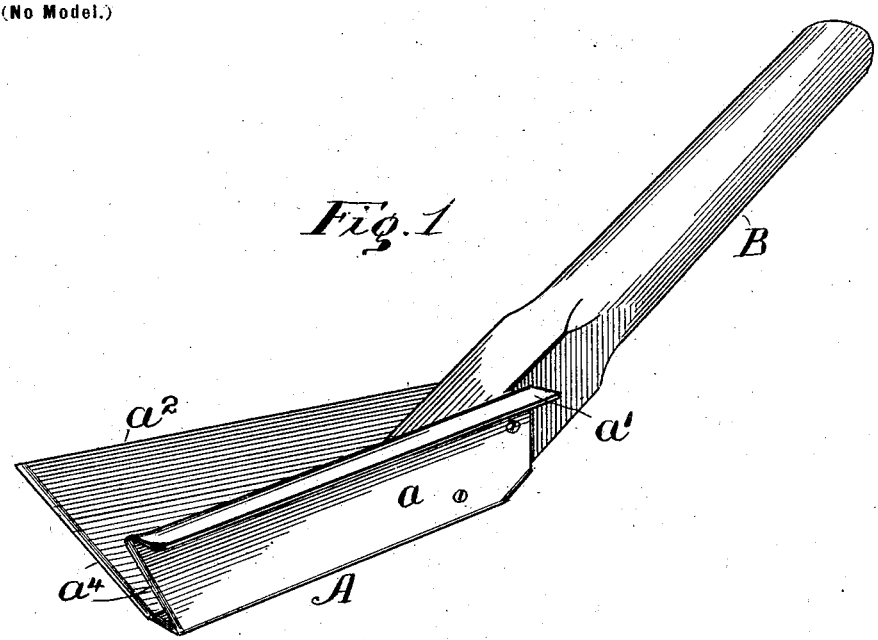
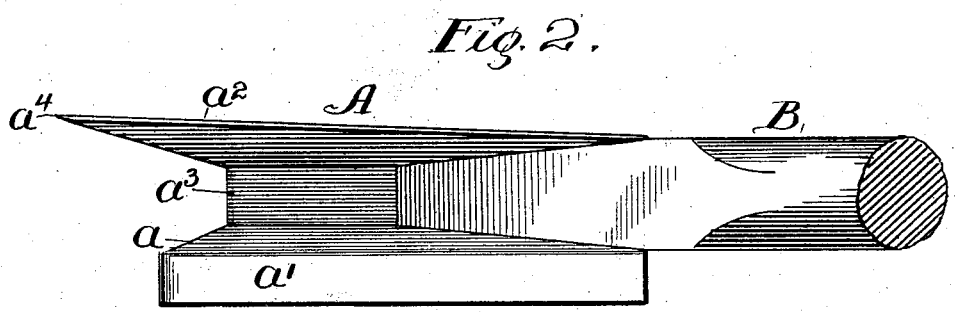
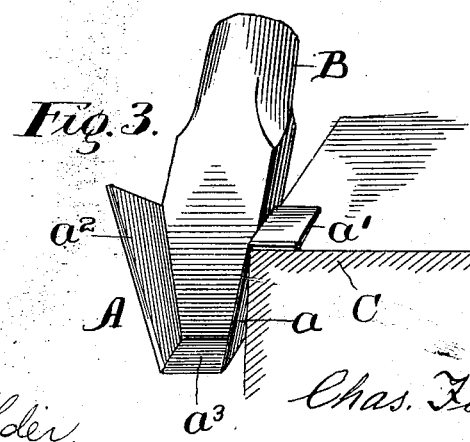
Witnesses: Fred S. Goff, Leroy W. Holder.
Inventor: Chas. Fernstrom

UNITED STATES PATENT OFFICE.

CHARLES FERNSTROM, OF CHICAGO, ILLINOIS.

LAWN-TRIMMING IMPLEMENT.

SPECIFICATION forming part of Letters Patent No. 709,976, dated September 30, 1902.

Application filed September 12, 1901. Serial No. 75,159. (No model.)

*To all whom it may concern:*

Be it known that I, CHARLES FERNSTROM, a citizen of the United States, residing at No. 6608 Ellis avenue, in the city of Chicago, county of Cook, and State of Illinois, have invented a new and useful Improvement in Lawn-Trimming Implements, of which the following is a specification.

My invention relates to improvements in lawn-trimming implements, the object of which is to produce a device for cutting the edges of lawns contiguous to sidewalks and the like, where it is desirable to give a neater and more finished appearance to the lawns. It is well known that it is almost impossible to keep the lawn trimmed neatly along the edge where it meets the sidewalk or other objects traversing the same with the ordinary lawn-mower, and for that reason it has been customary to trim these edges with large shears or knives; but this is a laborious task and requires a great deal of time and care to produce any good effect. With my improved device this difficulty is obviated, and the trimming of the edges is accomplished by merely pushing the implement through the grass along the edge of the sidewalk or the like.

The invention is fully illustrated in the drawings furnished herewith, in which—

Figure 1 is a side perspective view of the device with the handle partly broken away. Fig. 2 is a plan view, and Fig. 3 is a front perspective, showing the device in position for use.

In the views, A represents the head of the implement, which may be constructed of sheet metal or the like bent into the proper shape, and B is a handle secured to the head and extending away from the rear thereof at a suitable angle, and $a$ $a^2$ the sides, a bottom $a^3$ connecting them and a flange $a'$ extending outwardly from the side $a$. The flange $a'$ is adapted to form a guide or rest for the device and, as shown in Fig. 3, rests upon the sidewalk, which is shown at C. This flange $a'$ controls the depth of furrow which the device may cut, and it is only necessary for the operator to keep the angle formed by the side $a$ and flange $a'$ against the edge of the sidewalk to produce a furrow of even width and depth. The side $a^2$ is preferably somewhat higher than the side $a$, so that the apparatus may cut into the sod where the same may happen to be slightly higher than the sidewalk. The front edges of the sides and bottom are preferably sharpened, as shown at $a^4$, to cut the grass and sod.

In using the device the flange $a'$ is held down upon the sidewalk and the sharpened front edges forced into the sod, thereby cutting a narrow furrow of even width and depth adjacent to the walk and producing a very neat and finished appearance to the lawn.

What I claim as my invention, and desire to secure by Letters Patent, is—

1. A lawn-trimming implement comprising a trough-shaped head adapted to cut into the sod, a guide adapted to rest upon the sidewalk and the like, to control the depth of furrow, and a handle suitably secured to said head.

2. A device for trimming lawns adjacent to sidewalks and the like, comprising substantially a head having sharpened cutting edges adapted to cut a narrow furrow, and a guide adapted to rest upon the sidewalk and control the depth of furrow.

3. A device for trimming lawns adjacent to sidewalks, comprising substantially a head having the sides, $a$, $a^2$, and connecting-bottom, $a^3$, sharpened upon their forward edges, and adapted to cut into the sod to produce a narrow furrow, a flange, $a'$, extending outward from the side $a$, and adapted to rest upon the sidewalk to guide the device in its movement with respect therewith, and a handle suitably secured to said head.

In testimony whereof I affix my signature in presence of two witnesses.

CHAS. FERNSTROM.

Witnesses:
 FRED L. GOFF,
 LEROY W. HOLDER.